Figure 1:
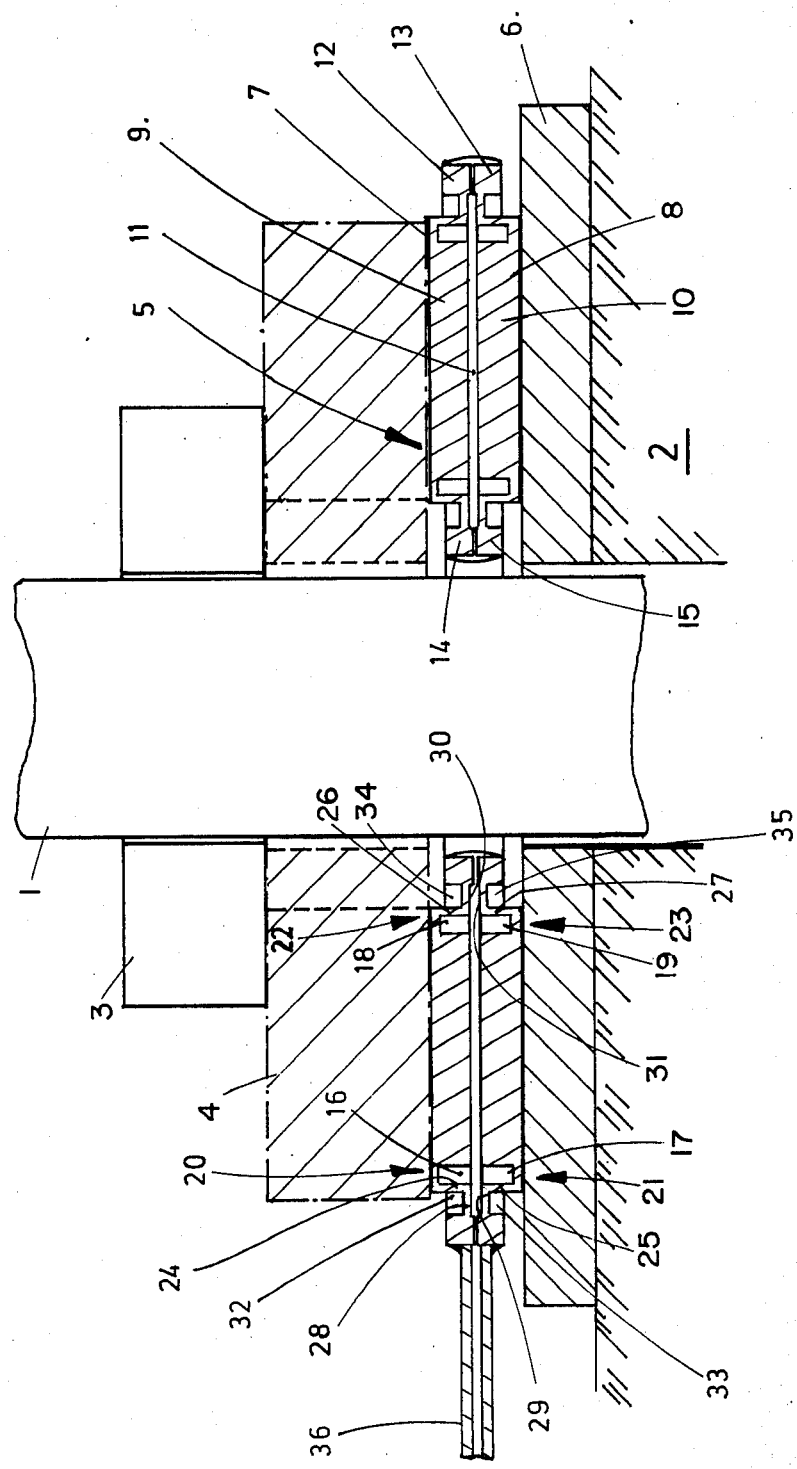

United States Patent [19]

Glötzl et al.

[11] 3,978,722
[45] Sept. 7, 1976

[54] DYNAMOMETER FOR ANCHORS IN BUILDING CONSTRUCTIONS

[75] Inventors: Rainer Glötzl, Karlsruhe; Franz Glötzl, Rheinstetten, both of Germany

[73] Assignee: Firma Franz Glötzl, Germany

[22] Filed: Aug. 12, 1975

[21] Appl. No.: 603,801

[30] Foreign Application Priority Data
Aug. 20, 1974  Germany............................ 2439782

[52] U.S. Cl. .............................. 73/141 R; 73/88 E
[51] Int. Cl.² ............................................. G01L 1/02
[58] Field of Search................. 73/88 E, 88 F, 140, 73/141 R; 116/DIG. 34; 177/208, 209

[56] References Cited
UNITED STATES PATENTS 2,022,203    11/1935    Hughes ......................... 73/141 R X
3,529,468    9/1970    Carlson ............................ 73/88 E X
3,747,400    7/1973    Finsterwalder..................... 73/88 E
3,874,229    4/1975    Ormond............................ 73/141 A

*Primary Examiner*—Charles A. Ruchl
*Attorney, Agent, or Firm*—Craig & Antonelli

[57] ABSTRACT

A dynamometer for measuring forces on an anchor in a building construction. The dynamometer has two closely spaced annular discs enclosing a pressure chamber between them. The discs fit around the head of an anchor between a fixed support and a fixing nut. The chamber between the discs contains pressure medium and in use is connected to a pressure gauge. At least one of the discs has flexible zones adjacent its inner and outer peripheries and the discs are otherwise of rigid construction.

6 Claims, 4 Drawing Figures

DYNAMOMETER FOR ANCHORS IN BUILDING CONSTRUCTIONS

This invention relates to a dynamometer for anchors in building constructions having a measurement device arranged to be inserted between a fixed support and an anchor nut.

In the attachment of anchors to rock structures, and also to concrete structures, the pre-tension force of the anchor is often required to be measured over a long period of time in order, for example, to be able to ascertain in good time any deterioration due to alterations in shape, ground movements, terrain displacements etc. This measuring technology has particular importance in the construction of dams, tunnels etc.

Besides the stress measuring devices known for a long time from the general measuring technology, it is known to use as dynamometers for this function essentially only displacement measuring apparatus. Thus, for example, there is inserted between the anchor nut and the support a spring and the varying spring length is monitored by a sensor measuring the distance between the spring supports. It is furthermore known to use elastic bodies in place of such springs. The drawback common to both of these known arrangements is that they are very sensitive to temperature fluctuations which in the present field of use must be reckoned with to a considerable extent. The same applies also to bearing fluctuations of the anchor and of the outer attached clamping means. These dynamometers which are preferred compared with stress measuring devices, because of the operating certainty and manufacturing cost, operate therefore with only a moderate accuracy and reproducibility.

Known dynamometers in the form of piston measuring apparatus in which the displacement of a piston in a cylinder is measured as representing a pressure increase and which can be read directly in force since the piston face is fixed are not of value for the present purpose on the one hand from the point of view of price and on the other hand due to the sensitivity to breakdown. They have the advantage that they are not sensitive to temperature fluctuations and also displacements, and therefore useful measuring results can be obtained.

An object of the present invention is to provide a dynamometer, for anchors in building constructions, which has measuring technological advantages of a piston measuring apparatus, in particular consistency of the datum level and thereby accuracy and repeatability of the measuring result, and which on the other hand is not sensitive to the temperature fluctuations and position variations which occur in practice.

According to the invention therefore, there is provided a dynamometer for anchors in building constructions, having a measuring device arranged to be inserted between a fixed support and a fixing nut of the anchor, said measuring device enclosing a pressure measuring fluid and comprising two thick walled rigid annular discs arranged to surround a head of the anchor which annular discs are connected to one another in a pressure-tight manner at outer and inner peripheries of the discs and at a distance from one another so as to form a pressure chamber, the wall thickness of at least one of the two annular discs being weakened in the direct vicinity of the inner and outer peripheries thereof from the side facing the other disc so as to form flexible zones over the whole measuring area.

Stress and force variations on the anchor lead to variations of the pressure in the pressure chamber. These pressure variations may be measured in conventional manner by means of a pressure gauge, if necessary, with limit sensors for a signalling system or the like, or by means of an excess pressure valve built into a pressure measuring pipe which is connected to a pump. The measured pressure variation may be for the following reasons proportional directly and reproducibly to the force variation: The cross-sectional face of the pressure chamber extending cross-wise to the directional force can be due to the rigid construction of the annular discs, constant over the whole measuring area. These rigid annular discs are effectively linked to the inner and outer peripheries thereof via the flexible zones obtained by the weakening of the disc walls so that a similar kinematic arrangement as with a piston measuring apparatus is obtained without however involving disadvantages in respect of sealing since the measuring device is completely closed.

Pressure cushions frequently used in rock construction for stress measurement in stone or concrete would indeed be usable in principle in the present field of use but these pressure cushions have the drawback that the actual effective cross-sectional face is not constant. There are formed under pressure lens-like hollow spaces with, as the case may be, irregular edge limitations so that the actual present reference face is subjected to uncontrollable fluctuations. Also such pressure cushions can be produced only with difficulty in the annular shape necessary with anchors and then the said surface fluctuations are still greater.

According to a preferred embodiment of the present invention the flexible zones are formed by an annular groove recessed near the outer and inner peripheries of the annular disc from the side facing the other annular disc. The two discs can thus be produced as simple turned parts so that the whole apparatus can be made with far less expenditure compared with conventional apparatus.

In a further construction of the preferred embodiment it is provided that directly next to each annular groove and on the outer side thereof there is arranged a further annular groove which is recessed from the side of the annular disc facing away from the other disc leaving a narrow web part.

With this arrangement, the flexible zones consist of the weakened sections of the annular disc, the thin peripheral walls which result from the adjacent recesses and the likewise thin web parts, whilst the annular disc over its greatest area as well as also the flanges is rigid. Thus it can be ensured that the annular face enclosed between the inner and outer flanges remain always constant. Due to the type of weakening which corresponds to a thin walled Z-profile a kind of joint is provided around which the thick walled annular disc can lift.

Although the aforementioned constructional features need only be realised on one disc, advantageously both annular discs are formed identically. This brings about from the manufacturing technical point of view the advantage that for each apparatus only two equal parts have to be manufactured and upon connecting the two discs no irregular displacement occurs. From the mounting technological point of view it is of advantage for the built-in position of the measuring device to be a matter of indifference so that its function cannot be adversely influenced by a faulty construction.

The measuring line leading to the measuring device is placed suitably on two outer flanges and extends parallel and centrally to the annular discs.

Figure 2:
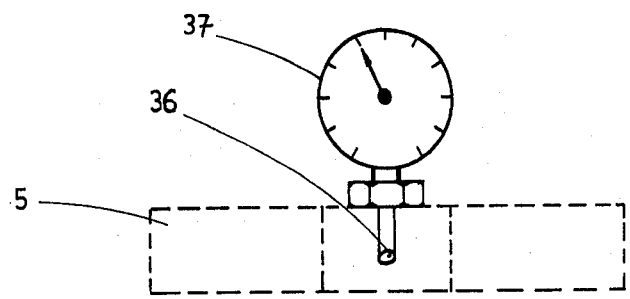
Figure 3:
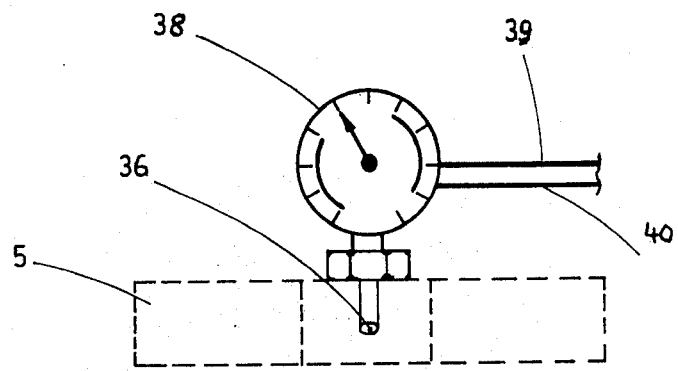
Figure 4:
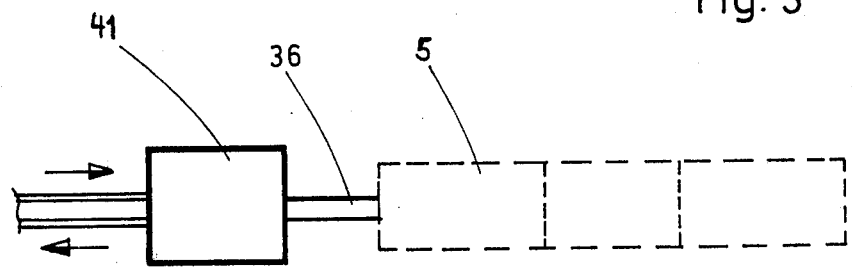
Figure 4:
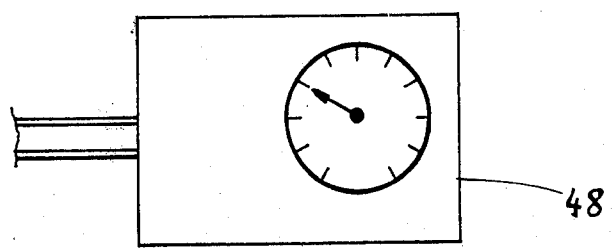

The invention will now be described further by way of example only and with reference to the accompanying drawings in which:

FIG. 1 is an axial section through the head of an anchor fitted with the measuring device of one form of a dynamometer according to the invention; and FIGS. 2 to 4 are diagrammatical illustrations of different embodiments of pressure gauges for use with the arrangement of FIG. 1.

FIG. 1 shows the head of an anchor 1 which, for example, is inserted in rock, concrete 2 or the like. The anchor may be of any known construction and a detailed description of the anchor is therefore not necessary. The anchor 1 is pretensioned by means of a nut 3 which is supported via a compensation plate 4, a measuring device or transducer 5 and a support plate 6 on the sub-soil 2. The measuring device 5 consists of two annular discs 7, 8 which surround concentrically the anchor 1 and in the embodiment shown are formed in the same manner. The annular discs 7, 8 are formed as thick walled rigid plates 9, 10 and are disposed at a short distance from one another so that a pressure chamber 11 is formed between them. This pressure chamber 11 which is therefore limited on the one hand by the two plates 9, 10 is on the other hand closed by two likewise rigid edge flanges 12, 13 and 14, 15 on the inner and outer periphery of the two annular discs.

In the direct vicinity of the outer and inner periphery the two plates 9, 10 are weakened by recessed annular grooves 16, 17 and 18, 19 such that a flexible zone 20, 21 and 22 and 23 results. This zone is formed on the one hand by the weakened wall thickness of the plate, and on the other hand by the two thin peripheral walls 24, 25 and 26, 27 remaining at the sides of the recesses. The flexible zone is, in the embodiment shown, extended by thin flange webs 28, 29 and 30, 31 connected to the peripheral walls 24 to 27 which are the bottom walls of annular grooves 32, 33 and 34, 35 recessed on the outside. The webs merge with the thick walled flange 12, 13 and 14, 15. Both annular discs may be made as simple turned parts. The connecting of the annular discs may be effected by welding soldering or the like.

At any desired place on the measuring device, the measuring line 36 is fixed, for example, by soldering. The two flanges 12, 13 are at this place provided with a small cross bore. This measuring line may as shown in FIGS. 2 and 3 be connected to a fixed pressure gauge 37 or 38 and the pressure gauge 38 may be provided with two limit devices 39, 40 for example, corresponding to maximum and minimum values, which are arranged to actuate a signalling system or the like when the force on the anchor exceeds or falls below a predetermined pre-tension force. In FIG. 4 an embodiment is shown in which the measuring line 36 leads to an excess pressure valve 41 the pressure of which is produced by a conveyor pump 48 and is measured in the conventional manner.

What I claim is:

1. A dynamometer for anchors in building constructions, having a measuring device arranged to be inserted between a fixed support and a fixing nut of the anchor, said measuring device enclosing a pressure measuring fluid and comprising two thick walled rigid annular discs arranged to surround a head of the anchor which annular discs are connected to one another in a pressure-tight manner at outer and inner peripheries of the discs and at a distance from one another so as to form a pressure chamber, the wall thickness of at least one of the two annular discs being weakened in the direct vicinity of the inner and outer peripheries thereof from the side facing the other disc so as to form flexible zones over the whole measuring area.

2. A dynamometer according to claim 1, wherein the flexible zones are formed by annular grooves recessed near the outer and inner peripheries of the annular disc and extending inwardly from the side facing the other annular disc.

3. A dynamometer according to claim 1, wherein the flexible zones are formed by annular grooves and wherein, directly adjacent to each annular groove on the outer side thereof, there is arranged a further annular groove recessed in from the side of the annular disc facing away from the other disc and which defines a narrow web part.

4. A dynamometer according to claim 1, wherein both annular discs are formed identical.

5. A dynamometer according to claim 1, wherein both annular discs are formed as turned parts.

6. A dynamometer according to claim 1, wherein a measuring line is fixed on two outer flanges of the discs and extends parallel and centrally to the discs.

* * * * *